United States Patent
Agrawal et al.

(10) Patent No.: US 10,172,064 B2
(45) Date of Patent: Jan. 1, 2019

(54) STATE MIGRATION OF EDGE-OF-NETWORK APPLICATIONS

(71) Applicant: International Business Machines Corporation, Armonk, NY (US)

(72) Inventors: Dakshi Agrawal, Monsay, NY (US); Chatschik Bisdikian, Chappaqua, NY (US); Dinesh C. Verma, Mount Kisco, NY (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 14/964,364

(22) Filed: Dec. 9, 2015

(65) Prior Publication Data

US 2016/0095041 A1    Mar. 31, 2016

Related U.S. Application Data

(63) Continuation of application No. 13/654,137, filed on Oct. 17, 2012, now Pat. No. 9,258,666.

(51) Int. Cl.

| | | |
|---|---|---|
| H04W 76/10 | (2018.01) | |
| H04W 36/30 | (2009.01) | |
| H04W 4/00 | (2018.01) | |
| H04L 29/08 | (2006.01) | |
| H04W 8/08 | (2009.01) | |
| H04W 72/08 | (2009.01) | |

(52) U.S. Cl.
CPC ............. *H04W 36/30* (2013.01); *H04L 67/02* (2013.01); *H04L 67/1097* (2013.01); *H04W 4/00* (2013.01); *H04W 8/08* (2013.01); *H04W 72/087* (2013.01); *H04W 76/10* (2018.02)

(58) Field of Classification Search
CPC ..... H04W 36/14; H04W 36/08; H04W 84/12; H04W 36/0055; H04W 36/22
See application file for complete search history.

(56) References Cited

U.S. PATENT DOCUMENTS

| | | |
|---|---|---|
| 6,810,409 B1 | 10/2004 | Fry et al. |
| 7,552,218 B2 | 6/2009 | Kaluskar et al. |
| 7,739,392 B2 | 6/2010 | Wu |
| 7,821,995 B2 | 10/2010 | Das et al. |
| 7,920,866 B2 | 4/2011 | Bosch et al. |

(Continued)

OTHER PUBLICATIONS

Enhanced fast handoff scheme for heterogeneous wireless networks, Christian Makaya, Samuel Pierre, Available online Jan. 26, 2008 (Year: 2008).*

(Continued)

*Primary Examiner* — Andrew W Chriss
*Assistant Examiner* — Atique Ahmed
(74) *Attorney, Agent, or Firm* — Scully, Scott, Murphy & Presser, P.C.; Rabin Bhattacharya

(57) ABSTRACT

A system and computer program product to externalize mobile device state migration (i.e., checkpointing) without being dependent upon any particular Edge Application (EdgeApp) proxy server or cellular network base station. In this manner, the Edge Application (EdgeApp) proxy server does not have to be aware of a migration process, yet will enable state information to be provided to other EdgeApp proxy/server nodes at the edge of the network (cell tower).

20 Claims, 4 Drawing Sheets

(56) References Cited

U.S. PATENT DOCUMENTS

| | | | |
|---|---|---|---|
| 8,014,819 | B2 | 9/2011 | Manousakis et al. |
| 8,015,408 | B2 | 9/2011 | Movva et al. |
| 8,059,557 | B1 | 11/2011 | Sigg et al. |
| 8,068,502 | B2 | 11/2011 | Mukherjee et al. |
| 2003/0026260 | A1 | 2/2003 | Ogasawara et al. |
| 2005/0130659 | A1 | 6/2005 | Grech et al. |
| 2007/0002799 | A1 | 1/2007 | Hunzinger |
| 2007/0218903 | A1 | 9/2007 | Grech |
| 2009/0029713 | A1 | 1/2009 | Dharia et al. |
| 2009/0274106 | A1 | 11/2009 | Weerakoon et al. |
| 2009/0285225 | A1 | 11/2009 | Dahod |
| 2010/0054204 | A1* | 3/2010 | Dolganow ............ H04W 48/17 370/331 |
| 2010/0091782 | A1 | 4/2010 | Hiscock |
| 2010/0179987 | A1* | 7/2010 | Sebastian ............ H04L 12/1859 709/203 |
| 2010/0202407 | A1* | 8/2010 | Edge ................... H04W 36/385 370/331 |
| 2010/0278145 | A1 | 11/2010 | Jabbari et al. |
| 2011/0138064 | A1 | 6/2011 | Rieger et al. |
| 2011/0176537 | A1* | 7/2011 | Lawson .............. H04L 65/1046 370/352 |
| 2011/0265174 | A1 | 10/2011 | Thornton et al. |
| 2012/0076120 | A1* | 3/2012 | Kovvali ................ H04W 76/11 370/338 |
| 2012/0166618 | A1 | 6/2012 | Dahod et al. |
| 2012/0304250 | A1 | 11/2012 | Hu et al. |
| 2013/0017801 | A1* | 1/2013 | Shaikh .................... H04W 4/22 455/404.1 |
| 2014/0067987 | A1 | 3/2014 | Agrawal et al. |

OTHER PUBLICATIONS

Reiter et al., "Quiver: Consistent Object Sharing for Edge Services", IEEE Transactions on Parallel and Distributed Systems, vol. 19, No. 7, Jul. 2008, pp. 878-889.

Begum et al., "A DHT-Based Process Migration Policy for Mobile Clusters", 201, Seventh International Conference on information Technology: New Generations (ITNG), pp. 934-938.

Yarkan et al., "Impact of Mobility on the Behavior of Interference in Cellular Wireless Networks", IEEE Communications Society subject matter for publication in the IEEE "GLOBECOM" 2008 proceedings., 2008 IEEE.

Jiang et al., "Web Prefetching in a Mobile Environment", IEEE Personal Communications, Oct. 1998, pp. 25-34.

Hyytia et al., "Random Waypoint Mobility Model in Cellular Networks", Networking Laboratory, Helsinki University of Technology, Finland, Oct. 28, 2004, pp. 1-11.

Bettstetter, "Mobility Modeling in Wireless Networks: Categorization, Smooth Movement, and Border Effects", Mobile Computing and Communications Review, vol. 5, No. 3, This article is modified version of the paper: C. Bettstetter, Smooth is Better than Sharp: A Random Mobility Model for Simulation of Wireless Networks. In Proc. of the 4th ACM International Workshop on Modeling, Analysis, and Simulation of Wireless and Mobile Systems (SMWiM), Rome, Italy, Jul. 2001. pp. 55-67.

Vijayan et al., "A Survey on Web-Pre-Fetching and Web Caching Techniques in a Mobile Environment", CS & IT-CSCP 2012.

Fang et al., "Teletraffic Analysis and Mobility Modeling of PCS Networks", IEEE Transactions on Communications, vol. 47, No. 7, Jul. 1999 pp. 1062-1072.

Bagrodia et al., "iMASH: Interactive Mobile Application Session Handoff", UCLA Computer Science, Los Angelos, CA 90095-1596, Jul. 2005.

Mochalski et al., "Deep Packet Inspection—Technology, Applications & Net Neutrality", ipoque, Sep. 2009, pp. 1-12.

Roy et al., "Application Level Hand-off Support for Mobile Media Transcoding Sessions", NOSSDAV '02, May 12-14, 2002, Miami, FL.

Makaya et al., "Enhanced fast handoff scheme for heterogeneous wireless networks", Computer Communications, 2008, Retrieved on Feb. 24, 2014, Retrieved from the Internet: <URL:http://gredes.ifto.edu.br/wp-content/uploads/Enhanced-fast-handoff-scheme-for-heterogeneous-wireless-networks.pdf> entire document.

International Search Report and Written Opinion dated Mar. 18, 2014, PCT/US2013/056589.

* cited by examiner ns. Users attach to the network using a PDP (Packet Data Protocol) context activation, once they have been validated and authorized by the SGSN an IP connection is established to the GGSN and allowed services can then be accessed. In an example implementation, when the GGSN 27 receives data addressed to a specific user, it checks if the user is active. If it is, the GGSN forwards the data to the SGSN 23 serving the mobile user, but if the mobile user is inactive, the data are discarded. The operator services network component 30, e.g., a cloud or data center for cellular network operations that provides those wireless communications services for providing mobile user connectivity with the Internet 50 and controls all the elements necessary to sell and deliver services to an end user including radio spectrum allocation, wireless network infrastructure, back haul infrastructure, billing, customer care and provisioning computer systems and marketing.

STATE MIGRATION OF EDGE-OF-NETWORK APPLICATIONS

CROSS-REFERENCE TO RELATED APPLICATIONS

The present application is a continuation application of and claims the benefit of the filing date of U.S. patent application Ser. No. 13/654,137, filed on Oct. 17, 2012.

FIELD

The present disclosure generally relates to cellular communications networks, and more particularly, a system and method for mobile wireless call hand-off and state-migration for roaming users whose call is handed off at cellular network edges to other edge nodes.

BACKGROUND

As users of mobile wireless devices (e.g., smartphone, mobile phone, tablet computer, etc.) change their point of attachment in the cellular network (by movement or migration away from a cell tower of a cell region) and start getting served by a new edge-of-network application aware proxy server or "EdgeApp" server, the state in the edge app proxy/server associated with the mobile user might need to be migrated from an old EdgeApp server at the source node to a new EdgeApp server at a destination node.

FIG. 1 shows the current infrastructure 10 for handling phone call handoff (communication connection characteristics) and mobile application state handoff. The cellular network 10 includes a first (source) cell tower A (or base station) having edge of network components, e.g., a proxy server 20a, that is functioning as the cell that the mobile device 12 is in current communications over path 21. The EdgeApp proxy server 20a may reside at a web-site, or a cloud) at the cellular network infrastructure 10. The network 10 further includes a second (destination) cell tower B (or base station) having edge of network components, e.g., an application-aware "EdgeApp" server or proxy server 20b. As known in the art, as the mobile device 12 moves out of communications range with first base station A, the cellular network enables the second base station B in another geographical area to maintain the communications session with the mobile device 12, e.g., over a new communications path 22. That is, functionality is inherent in cellular network 10 to maintain a current communications session between the mobile 12 and the cell tower B as the mobile exits an area 15a serviced by the first (source) tower A and enters into an area 15b serviced by the cell tower B, in a seamless manner.

To effect the seamless transition, cellular network infrastructure 10 includes further network communications nodes or elements including a Radio Network Controller devices (RNC) 25A, 25B associated with cell Base stations A and B, respectively, in a "3G" wireless network, provide control and management of the radio transceivers in the cell node (base transceiver station) equipment, as well as perform management tasks like soft handoff. Additional network components include radio and gateway/router devices including the Serving GPRS (General Packet Radio Service) Support Node (SGSN) 23 which handles all packet switched data within the network, e.g., the mobility management and authentication of the users, and relays the data between the SGSN and a relevant Gateway GPRS Support Node (GGSN) 27 which is the IP access point for mobile users to the wider internet, corporate VPN or other IP access net- In the conventional cellular network infrastructure 10, functionality inherent to the base station EdgeApp proxy servers 20a, 20b further maintains any state of an application being run by users on their mobile devices 12. More particularly, mobile device 12 includes one or more applications for communicating (e.g., communications applications components) and mobile (user) applications, e.g., video display, voice recognition, etc. It is a trend that these mobile applications increasingly communicate with the base station EdgeApp proxy servers 15a, 15b. For example, a mobile device 12 with a voice activation may include a voice recognition function at the cellular network itself at an EdgeApp server 20a,b. As a further example, a video display application on the mobile device communicates with a proxy inside the cellular network that may provide the content in a format for use by the particular mobile 12. A current trend in the art is for application service providers to "push" these mobile application proxy server components closer to the network "edge", i.e., place the application components closer to the network proxy server side components including application components, as close as possible to the mobile client (i.e., close to the cell tower, for example) to save bandwidth, minimize communication latency, and off-load functionality. These close to edge of network applications are referred to herein as "EdgeApps". Further, the EdgeApp server maintains state data including, but not limited to: communication state (e.g., connection characteristics) or pre-cached content (media files or web pages) all of which may need to be migrated to another node in order to achieve certain level of QoS for a roaming mobile user. This is migrated from one EdgeApp server to another as the mobile device migrates and is serviced by new nodes.

Currently, as mobile device 12 users change their point of attachment in the cellular network and commence being served by a new EdgeApp server (see FIG. 1), the state in the edge app proxy server associated with the mobile user might need to be migrated from old EdgeApp server (e.g., proxy server 20a) to new EdgeApp server (e.g., proxy server 20b) in order to maintain providing continuous uninterrupted service (e.g. state: connection characteristics) and to continue providing same level of quality of service (e.g. state: pre-cached objects that will be served fast from EdgeApp proxy/server). Currently, the EdgeApp proxy/server needs to be designed and architected so as to support such functionality (handoff and state-migration awareness) enabling state transfer, e.g., according to network controlled, or mobile device controlled techniques, for example.

That is, currently, the EdgeApp/Proxy server are designed and architected so as to explicitly support such functionality (referred to as: hand-off and state-migration awareness) and either uses a cluster-based design, which increases complexity or employs a specific protocol (e.g. multicast) for disseminating that state to multiple other EdgeApp servers. That is, migration aware functionality (multicast, migration-awareness, cluster-based architecture) proxy server has to be aware of migration actions to provide seamless transition to users. Unless EdgeApp/Proxy server provides migration aware services, the system may not be able to meet the QoS or QoE service guarantees. In addition, legacy application proxy software that has not been designed to explicitly support migration of mobile users cannot provide the full benefits while being deployed at the edge of the network.

It would be highly desirable to provide a generic approach for EdgeApp proxies/servers for roaming users without explicitly requiring handoff support by them.

BRIEF SUMMARY

There is provided, in one aspect, a system and method that externalizes state migration (checkpointing) without being dependent upon any particular EdgeApp/Proxy server or base station. In this manner, the EdgeApp/Proxy server does not have to be aware of a migration process, yet will enable state information to be provided to the edge of the network (cell tower).

In one aspect, there is provided a method for providing enhanced quality of experience (QoE) to mobile device users. The method comprises: obtaining, from packet transmissions between a mobile device and a current communications network edge node providing a point of attachment to the network, an application state of one or more applications currently running in the mobile device; populating the application state from storage at the current network edge node to a storage device associated with a destination network edge-node, and employing the populated application state at the destination network edge-node to enable seamless continued service to the mobile device user prior to the destination network edge-node becoming a new point of attachment.

Further to this aspect, the employing of application state includes reconstructing state for a mobile device application at the destination network edge-node prior to a roaming mobile user device session handoff from the current point of attachment.

In one embodiment, the method further includes: detecting migration of the mobile device user from one point of attachment of a source network cell to another attachment point in a destination network cell; and generating a trigger to initiate the populating and reconstructing upon the detecting.

In a further aspect, there is provided a system for providing enhanced quality of experience (QoE) to mobile device users. The system comprises: a first computing device associated with a source communications network edge node for servicing a mobile device by providing a point of attachment to a communications network, the computing device maintaining associated state information corresponding to one or more applications currently running in the mobile device; a second computing device associated with a destination communications network edge node for servicing a mobile device by providing a new point of attachment to the communications network when roaming away from the source network edge node; and a third computing device provided in the network upstream from the network edge, the third device including an associated memory storage device and configured to perform a method to: obtain, from packet transmissions between the mobile device and the communications network while being serviced by the first computing device, associated state information of the one or more applications for storage at the associated memory storage device; populate the application state from storage at the associated memory storage device to a storage device associated with the second computing device at the destination network edge node, wherein the second computing device is configured to employ the populated application state at the destination network edge-node to enable seamless continued service to the mobile device user prior to the destination network edge-node becoming the new point of attachment.

A computer program product is provided for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which.

DETAILED DESCRIPTION

In one aspect, there is provided a generic approach to checkpoint state externally for roaming mobile wireless device user(s) so that application servers at the "edge of network" or "EdgeApp" proxies/servers do not require explicit handoff support. The generic approach continues providing uninterrupted service (e.g. state: connection characteristics) and continues providing same level of quality of service (e.g. state: pre-cached objects that will be served fast from EdgeApp proxy/server) as mobile users attach from a source point of attachment to a destination point of attachment.

Further to this aspect, the cellular network equipment is augmented with "application state inspection-and-replay" functionality that can be used to reconstruct state as a roaming user hands-off from one point of attachment to another IT instrumentation in the cellular infrastructure.

In one embodiment, Deep Packet Inspection (DPI) techniques are employed to obtain state from the communications of the mobile user as it takes place on the "wire" without requiring EdgeApp proxy/server to perform "checkpointing" and state transfer. As known, Deep Packet Inspection can be provided either by a specialized hardware appliance, or by a software library (software DPI) that runs on off-the-shelf server systems.

In a further embodiment, besides employing DPI to extract state from intercepted IP packets, the ESIRS server may employ EdgeApp-specific application programming interfaces (APIs) for obtaining, replaying or reconstructing user state at the destination EdgeApp proxy/server.

Figure 1:
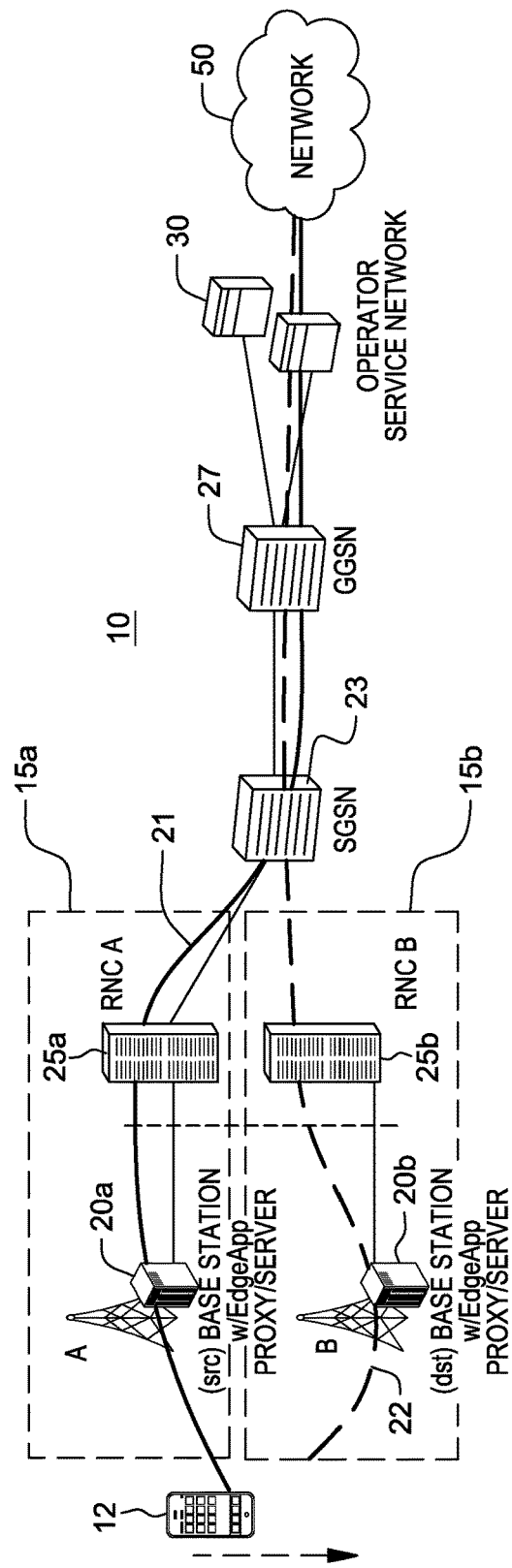
FIG. 1 depicts an embodiment of a conventional cellular network infrastructure 10 having functionality inherent to the base station EdgeApp proxy servers.
Figure 2:
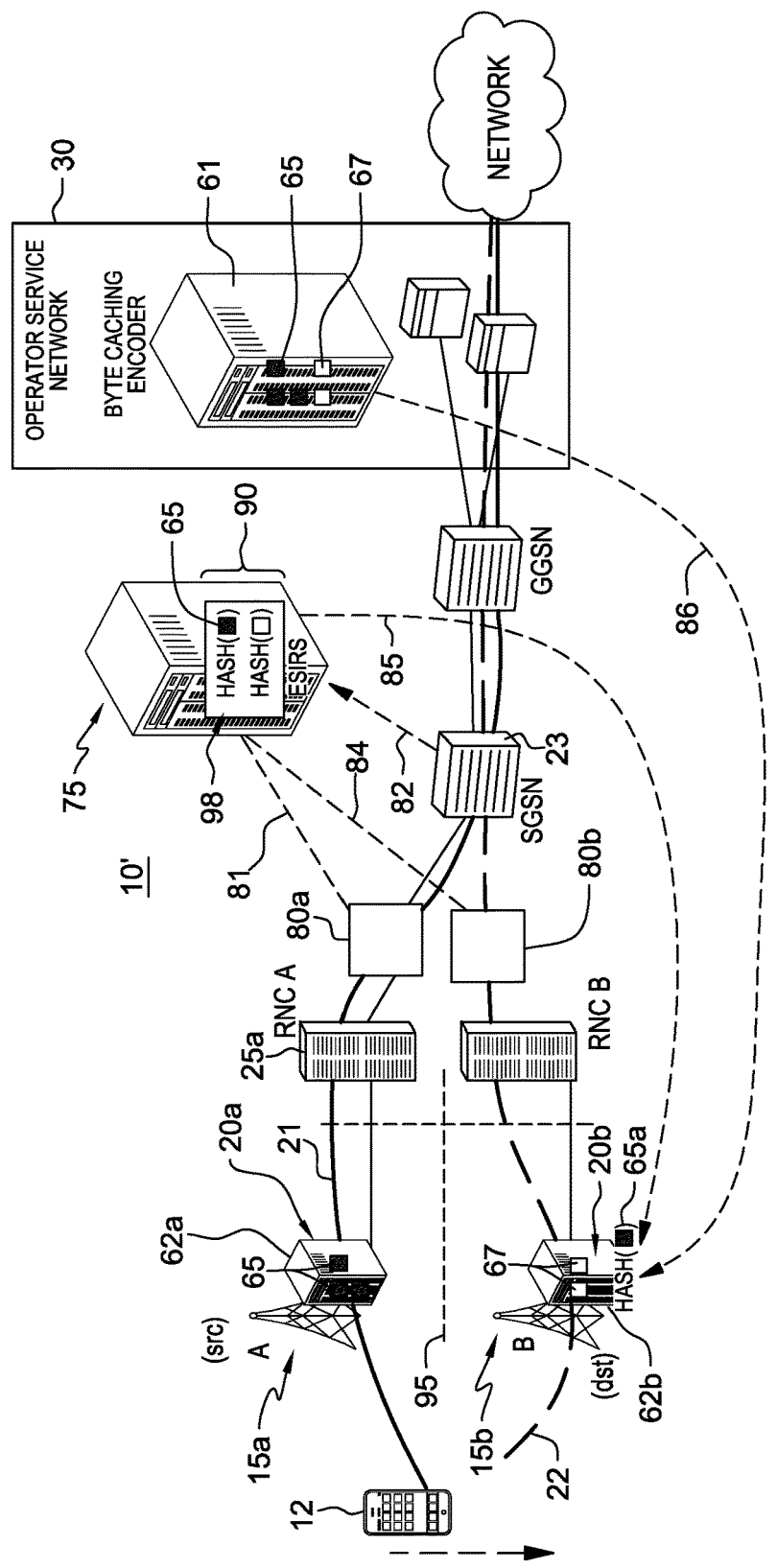
FIG. 2 depicts an embodiment of the cellular network infrastructure 10' provided with a further network element referred to as EdgeApp State Inspection and Replay Server (ESIRS) 75.

FIG. 2 shows the cellular network equipment 10' provided with a further network element referred to herein as Edge-App State Inspection and Replay Server (ESIRS) 75. This ESIRS server 75 includes software and programmed processes to obtain and log information associated with state of an edge application.

In one embodiment, a device 12, including, but not limited to a mobile phone (mobiles), e.g., smartphone, such as an iPhone or Blackberry, or like Personal Digital Assistant (PDA) device or tablet mobile computing device equipped for communicating over 3G and 4G wireless networks, etc., runs one or more applications for communicating (e.g., communications applications components) and runs mobile (user) applications, e.g., video playback, voice recognition applications (mobile applications), etc. The ESIRS 75, configured for use with cellular network A, includes state inspection system component 80A as a network element located downstream from base station A, the EdgeApp proxy 20a, and RNC 25a. State inspection system 80A, which may be part of ESIRS server 75, runs programmed software processes that perform a Deep Packet Inspection (DPI) 81 to extract a mobile device's state from its mobile network packet communications received at the base station A. Such mobile device communications state extracted from deep packet inspection at inspection system 80A includes current call connection characteristics, and call state data as communicated in packets in accordance with network communications protocols (e.g., TCP, TCP/IP) and equipment utilized.

In one embodiment, the ESIRS logs the EdgeApp-specific state via the stateful packet inspection. In one embodiment, deep packet inspection is performed of packets in the flow of packets for a specific mobile device communicating over the wireless network including looking not only at packet headers but also at the packet's payload. For example, the DPI-based protocol may be used to classify/identify a user mobile application using a number of different techniques including but not limited to: 1) Pattern matching: the scanning for strings or generic bit and byte patterns anywhere in the packets, including the payload portion, usually at fixed locations; 2) Behavioral analysis: the scanning for patterns in the communication behavior of an application, including absolute and relative packet sizes, per-flow data and packet rates, number of flows and new flow rate per application; and, 3) Statistical analysis: the calculation of statistical indicators that can be used to identify transmission types (e.g. real-time audio and video, chat, or file transfer), including mean, median and variation of values collected as part of the behavioral analysis, and the entropy of a flow. This is in addition to typical communications characteristics obtained by shallow packet inspection that tracks network connections or flows by grouping all packets with the same 5-tuple { source IP, destination IP, source port, destination port, layer-4 protocol}. The process saves state (connection characteristics, user application data, and byte caching) externally (with respect to the edge of network node or EdgeApp proxy server) and thus, is managed externally, not by the EdgeApp proxy server but by the state inspection system. The EdgeApp proxy server 20A does not have to interact at all.

In one embodiment, examples of call state data include TCP state (e.g. TCP segment numbers and congestion control values) of ongoing connections served at the source EdgeApp proxy 20A that are obtained and are transferred to the destination EdgeApp proxy 20B to maintain same TCP connection status.

As a further example, state data include those data that would be stored by proxy/server-side edge applications including, but not limited to: storage, caching and security proxy servers, processing offload servers, content transformation proxies, connection acceleration proxies, etc.

In one embodiment, the data that represents the state that is logged via the packet inspection system is application-dependent. For example, if the Edge-of-Network (EdgeApp) application is a web caching system, then web links (URLs) to web content that have been requested by the mobile users can represent the state that is logged by the packet inspection system. The packet inspection system logs such state by capturing first the packets that are transferred through the edge-of-network server and then by (optionally) reconstructing the transport-layer flows and application-layer connections and the respective protocol objects.

For example, further state information extracted from deep packet inspection of received mobile device communications includes EdgeApp application-specific state data including current user and mobile applications state data, e.g., cached objects, and byte caching data associated with mobile device applications such as web-based video processing (e.g., transcoding) and voice recognition systems that are stored at EdgeApp proxy servers at the cellular network edge, web-application executable programs including but not limited to JavaScript and ActiveX objects, application-specific content such as PDF documents, text files, and all Multipurpose Internet Mail Extension (MIME) object types. The referred to caches can be located close to the mobile users, which would be adjacent to the base-stations of the cellular network infrastructure. In one example, the caches serve as the "EdgeApp server" that takes advantage of the external state migration mechanism.

In operation, according to prediction models or analysis of communications signals communicated via cellular network path 21, a mobility "event" regarding mobile device movement in cells in said cellular network is determined. For example, it may be predicted by mobility models at cellular network node (source node A) that a call hand-off of a device to a new cellular network node (destination node B) is imminent. This may be determined directly from signal strength of communications signals received from the mobile, and from direction information determined from the mobile's communicated signals. Another mobility event may include detecting a device's loss of mobile device reception due to loss of signal transmission, due to loss of cell phone power or other interruption of cell phone communication service.

Any network element that acts as a control node that manages mobility can signal the ESIRS about an upcoming handoff. For example, the Mobility Management Entity (MME) in the LTE access network could be such control node. In the case of a UMTS (Universal Mobile Telecommunications System) network, it could be either the SGSN or the MSC network elements. Thus, a network component such as the SGSN element 23 generates, or is otherwise implemented to provide a trigger or like mobility event notification signal 82 to the ESIRS server 75 indicating an upcoming mobile device call handoff. It may further indicate to what destination cell the ESIRS logged state for a mobile device is to be populated. Upon receiving a signal 82 of an upcoming handoff, ESIRS server 75 transfers or reconstructs the mobile device mobile application state at the destination EdgeApp proxy/server 20B associated with the determined destination cellular base station B. Particularly, ESIRS transfers EdgeApp-specific logged state 85 and requests state reconstruction at destination EdgeApp. The transfer may include particular cached objects, byte sequences and/or call state data 90 that have been stored at the server 75 according to the mobile device application.

Alternately, when implementing mobility models for predicting imminent mobile call handoff to an adjacent cell, the ESIRS may begin initiating state reconstruction at the adjacent cell's EdgeApp proxy server before receiving the trigger signal 82 of the upcoming handoff. Thus the ESIRS may begin to transfer EdgeApp-specific logged state 85 and request state reconstruction at the destination EdgeApp.

In one embodiment, the ESIRS employs EdgeApp-proxylets (software processes running in the ESIRS) that communicate with EdgeApp server for 1) obtaining or collecting state (e.g., via an API), e.g., application layer objects and messages extracted; 2) employing EdgeApp-specific interfaces to request replay or reconstruction of state at the destination EdgeApp proxy/server; and 3) knowing what state is relevant to each EdgeApp server so as to log it through Deep Packet Inspection or API. Different proxylets are included for communicating with different types of EdgeApp servers, for example, byte caching decode, web caching, and video transcoding proxy servers. In one embodiment, from IP packets, the DPI will obtain actual messages (e.g., HTML or web pages) and this and other application state is logged externally at the ESIRS. Other logged content may include pre-cached content including media files or web pages. Also proxylets may include extracting of video objects from communications from mobile device (or signature of video) and transcoding (transform) them for availability at the destination network edge-node. An EdgeApp-proxylet is therefore used to assist in the collection and logging of EdgeApp server state through EdgeApp-specific interfaces, and can either replace or complement the state extraction operation performed through Deep Packet Inspection. Additionally, an EdgeApp-proxylet can be used to call EdgeApp-specific interfaces to reconstruct the EdgeApp state for a mobile device at the destination EdgeApp proxy/server.

Thus, in the embodiment depicted, the cached objects or EdgeApp specific data (application) and call state (call session) data 90 associated with mobile applications that are logged at the ESIRS server associated with the base station A are checkpointed externally (not by the EdgeApp proxy/server), but downstream at the ESIRS server 75, while continuing to provide uninterrupted service (e.g. state: connection characteristics) and same quality of service/quality of experience levels (e.g. state: pre-cached objects that are served fast from EdgeApp proxy/servers). The mechanisms by which quality of service/experience level is guaranteed include (but are not limited to) caching, content transformation (including transcoding), TCP session splitting, web-specific optimizations such as request pipelining and persistent connections, etc. Thus, this state data can be managed externally not by the EdgeApp server management interface, but by the state inspection and reconstruction system.

In one example embodiment, links (also known to those skilled in the art as references, hyperlinks, Uniform Resource Identifiers (URIs) or Uniform Resource Locators (URLs)) to cached objects that had been requested by a user (via mobile device 12) are logged by ESIRS and, upon instruction from the ESIRS, may be pre-fetched at the destination EdgeApp proxy server 20b to "warm-up" its cache. In one embodiment, this is performed pro-actively, e.g., while a user mobile is attached to a cell A, in which the adjacent cell (e.g., destination cell B of coverage area 15B) is in 'sync' with the user state.

In a further embodiment, this is performed predictively, e.g., by leveraging mobility models created by a user. For example, predictive estimation of a user device location given presence in current cell in cellular network and attachment to current edge node (based on "mobility models" (e.g., the "Random Waypoint Mobility Model") may be employed at the network SGSN component to determine where the user is going—when managing handoff—which information is transmitted to the ESIRS device to trigger state transfer to the destination (e.g., adjacent network edge-node).

Alternately, links to cached objects that may be pre-fetched may be further performed by exploiting processes for determining micro-diversity, where a user is attached to a cell (e.g., cell A associated with source node coverage area 15A) but the user's signal 21 can be heard in at an adjacent cell (e.g., cell B of coverage area 15B) when the user approaches the coverage boundaries 95 of these cells.

In a further embodiment, processes may be implemented for clearing said populated state in adjacent nodes, e.g., should the user decide to turn around from the cell and leaves the adjacent node after a time period, or the user stops using a particular mobile application. This may be application specific, and in one embodiment, a time frame may include seconds, minutes, or could be estimated following the populating.

Figure 3:
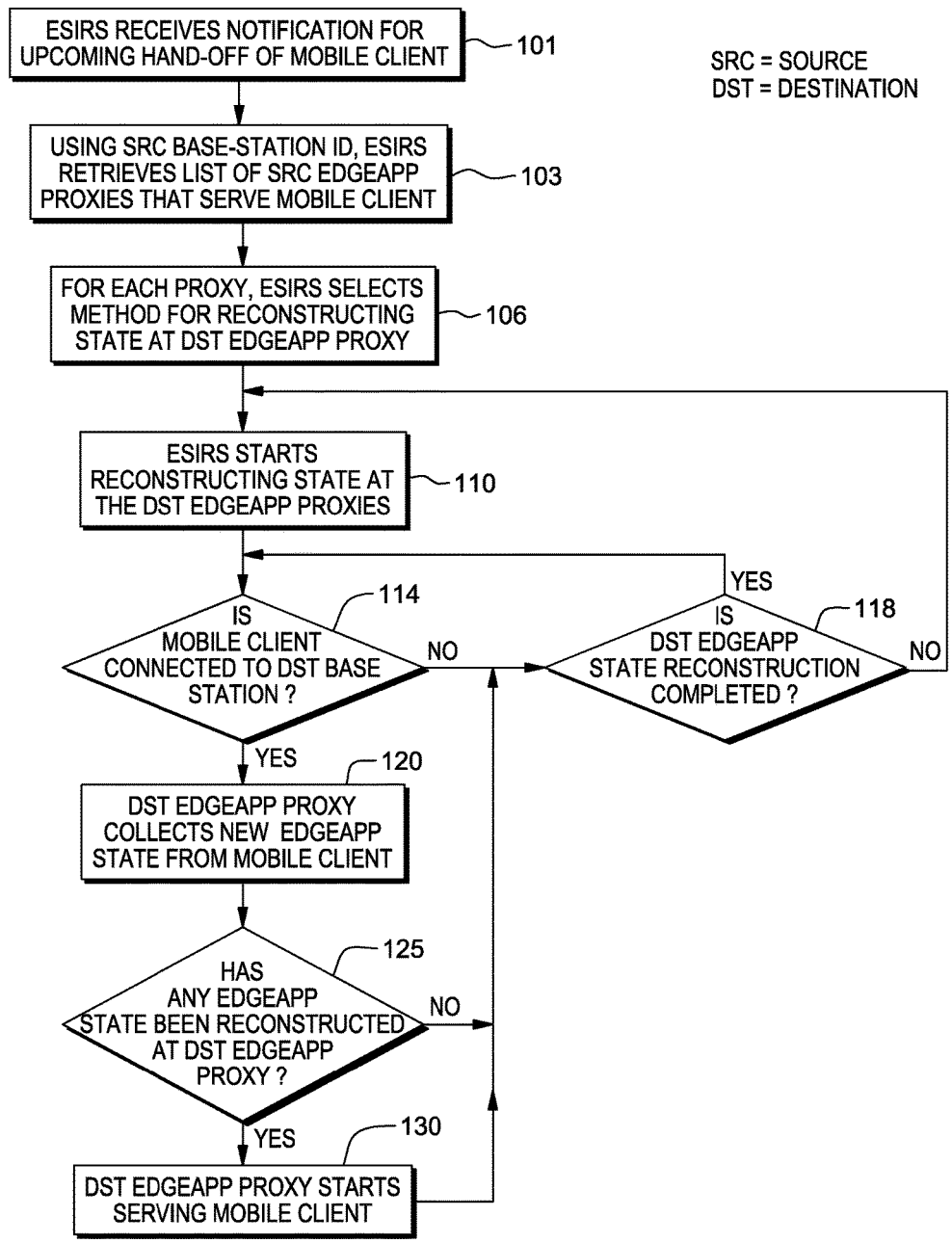
FIG. 3 is a flow chart depicting an embodiment of a method 100 performed by ESIRS 75 implemented in network of FIG. 2; and, FIG. 4 illustrates one embodiment of a hardware configuration of a computing system 200 employ the ESIRS of FIG. 2.

FIG. 3 depicts the method 100 employed by the ESIRS server 75 employed as part of a state inspection system. In one embodiment, as shown in FIG. 3, call and state data 90 of a mobile device(s) are logged at the ESIRS 75 in a generic way. The ESIRA 101 listens to communications between the mobile device and the EdgeApp server at the source base station A. These communications include those communicated over the wireless network communication path 21 to base station A and through RNC, SGSN, GGSN components and the Internet. In one embodiment, at 103, using a source base-station ID (obtained from the inspected communications), the ESIRS retrieves a list of source EdgeApp proxies that serve that mobile device client 12 using, for example, the source base-station ID obtained from the SGSN, the list of applications that are served by EdgeApp proxies at the source base-station through deep packet inspection. At 106, for each proxy, ESIRS is programmed to select a method for reconstructing state at the particular destination EdgeApp proxy based on the list. For example, using the list, the destination proxy can start fetching the web objects so that state can be easily reconstructed at a destination web-caching node proxy. Then, at 110, the ESIRS may utilize a corresponding EdgeApp proxylet to start "replaying", i.e., reconstructing any state at the destination EdgeApp server proxy(ies) on the list according to the selected method. At 114, ESIRS server implements processes to determine whether the mobile client 12 has connected to destination base station (e.g., destination cell B of coverage area 15B).

In FIG. 3, if it is determined that mobile client 12 has not connected to destination base station then at 118, a determination is made as to whether destination EdgeApp state reconstruction has completed. If, at 118, it is determined that EdgeApp state reconstruction has not completed, then the ESIRS returns to 110 and continues reconstructing state at the destination EdgeApp proxy(ies). Otherwise, it is determined that EdgeApp state reconstruction has completed at the EdgeApp proxy(ies), then the process returns to 114 to determine whether the mobile client 12 has connected to the destination base station. Upon determining by the ESIRS that the mobile client 12 has connected to destination base station, the process proceeds to step 120 where the Destination EdgeApp proxy (for coverage area B) collects new EdgeApp state from mobile device client 12.

Continuing to 125, FIG. 3, the ESIRS server invokes processes to determine whether any EdgeApp state has been reconstructed at destination EdgeApp proxy. This reconstruction of state refers to "old" state that had been accumulated in the previous (source) EdgeApp proxy. The new state that is logged at the destination EdgeApp proxy after the handoff is simply logged. If at 125, the ESIRS server determines that no EdgeApp state been reconstructed at destination EdgeApp proxy, then the process returns to 118 to determine whether the destination EdgeApp state reconstruction has completed, with the process returning to either step 110 for continued processing, or step 118 accordingly until EdgeApp state reconstruction is completed. Otherwise, at 125, if the ESIRS server determines that EdgeApp state has been reconstructed at destination EdgeApp proxy, then the process continues at 130 where the destination EdgeApp proxy server 20B for new cell coverage area starts serving mobile device client 12.

In a further embodiment, the EdgeApp server implements a byte caching technique in which data or byte chunks (e.g., a sequence of bytes) requested by a user of a mobile device application are cached locally at the EdgeApp server (at or close to the network edge). A byte caching infrastructure including a byte caching encoder device 61, shown as part of the operator services network 30 in FIG. 2, and a decoder device 62 near the base station services the multiple mobile device requests in cooperation with one each other. Multiple byte caching decoders 62 (of source and destination cells) can communicate with a single byte caching encoder 61, in the embodiment depicted.

Particularly, when a mobile device requests information, pieces of information are identified by the destination cache encoder device 61, e.g., as they are being downloaded over the network by/from Internet, and these pieces of information (e.g., byte sequences or "chunks" 65) may be stored at EdgeApp proxies having byte caching decoders. The byte caching encoder identifies sequences of bytes the mobile devices have requested, and byte caching decoders 62A, e.g., at EdgeApp proxy servers 20A of cell A, enable caching and decoding of the bytes at EdgeApp proxy 20A for use by the mobile device being serviced by that cell. For example, EdgeApp proxy server 20A at cell A is depicted as currently caching byte chunks 65. EdgeApp proxy server 20B at cell B is depicted as currently caching byte chunks 67.

In one aspect, state is reconstructed by assembling IP packets that are captured through the passive monitoring of the communication link between the EdgeApp server/Base Station-RNC and the rest of the cellular network (e.g., "backhaul" network). As shown in FIG. 2, "chunks" or sequences of bytes that are cached by the byte-caching system that serves as an exemplary EdgeApp (Edge Application). It is understood that any information that is relevant to the EdgeApp can be logged as "state" and need not be represented as "chunks". For example, a generic webcaching EdgeApp system might be interested in the web links (URLs) that have been requested by the mobile users, and essentially treat the collection of links as "state" that could be transferred from one EdgeApp server to another.

In operation, as shown in FIG. 2, the ESIRS server 75 implements processes to determine receipt of a signal 82 about a mobility event, e.g., mobile device migration from cell A to a new cell B. This triggers the replay of the traffic (state reconstruction) at byte caching decoder 62B of destination EdgeApp proxy 20B. The ESIRS initiates transfer of the EdgeApp specific state to destination EdgeApp proxy 20B via communications 85. In one example, at or near destination base station, e.g., base station B, destination EdgeApp proxy receives notification from ESIRS server and/or byte caching encoder 61 to look up its local cache to identify whether the sequence of bytes as notified are already in its cache for servicing that mobile device. That is, in one example depicted in FIG. 2, the mobile device is currently being served chunks (cached bytes/byte sequences) 65 stored at the source base station 20A. As the mobile device moves to the new cell for servicing by destination base station and byte caching functionality, it is determined that EdgeApp proxy server 20B currently does not have chunks 65, but rather has cached chunks 67. The ESIRS server will request the EdgeApp decoder to start downloading the chunks 65 that are missing at the destination proxy (e.g., to warm the destination EdgeApp server's cache).

In one embodiment, the ESIRS 75 implements proxylets that request via communications 85 the destination EdgeApp proxy 20B to fetch and reconstruct state according to information received from ESIRS. For example, the ESIRS may transfer the signatures 65A of chunks 65 (i.e., a hash applied to the chunk 65) to the destination EdgeApp byte caching decoder 62 and request that proxy to fetch the actual chunk 65 based upon the signature 65A provided. The byte caching decoder EdgeApp server 20B via communications 85 is notified by the ESIRS of the types of chunks (or their signatures) to retrieve. The destination EdgeApp proxy 20B then performs reconstructing state according to information received from ESIRS, e.g., by first fetching chunks 65 (or their signatures) for storage in its cache directly from the ESIRS. In one embodiment, as shown in FIG. 2, the destination EdgeApp proxy 20B may receive chunks 65 (byte sequences) for its current running mobile application from the operator services network byte encoder 61 via communications path 86.

With respect to the hash applied to the chunks 65, it is understood that the hash function 98 shown in the network embodiment of FIG. 2, is only used to highlight the use of a byte caching server (encoder/decoder) as the EdgeApp server. In the particular context of byte caching, hash functions are used to unique identify sequences of bytes that can be stored temporarily (cached) in the encoder/decoder (thus serving as signatures).

In one embodiment, the ESIRS itself will transfer the actual state itself, e.g., by file transfer, e.g., via File Transfer Protocol, HHTP protocol or Secure Copy Protocol (SCP) or some other file transfer means, and/or by copying chunks 65 to a local cache storage device at the destination EdgeApp proxy server.

In general, the mobile device application "state" can be communicated either wirelessly or via a wired network, depending on how the base station is connected to the rest of the cellular network infrastructure. State can be communicated any time the ESIRS deems appropriate, either before, during, or after a hand-off, or at any other point in time, independent of any hand-off (e.g. periodically).

As mentioned above, in a further embodiment, besides employing DPI to extract state from intercepted IP packets, the ESIRS server may employ EdgeApp-specific interfaces for replaying or requesting reconstruction of user state at the destination EdgeApp proxy/server. For example, application program interfaces (API) implemented at network EdgeApp proxy servers to externalize the application state it keeps may be used by the ESIRS 75 for purposes of migration.

For example, via an API, a non-migration aware web caching server (an example EdgeApp proxy) may provide a list of object web links to web objects cached and maintained by that web server used by the mobile device while attached to the source network node. The ESIRS may obtain this list via the API. Once trigger is received or upon determination by prediction models prior to receipt of trigger, the ESIRS communicates this list of web links to the destination EdgeApp (web caching) server that will service the mobile device at the destination network node. Upon providing the list to destination web caching proxy, it may start fetching the web objects and begin reconstructing the process flow and replaying state. It is understood that, rather than a list, individual links to web objects may be obtained by the ESIRS via an EdgeApp specific API and communicated to the destination Edgeapp proxy to facilitate its caching. It is further understood that some other function at the destination EdgeApp may emulate a client that will be requesting the list of web links, thus populating the EdgeApp web cache proxy indirectly.

In this embodiment, via an EdgeApp specific interface (API), the ESIRS will send notification to a destination byte caching decoder close to the network edge, so that the destination byte caching decoder retrieves particular sequence of bytes directly from the source node cache at the edge of network rather than downloading via the whole infrastructure.

In either embodiment, the destination EdgeApp proxy 20B (and decoder therein) reconstructs state in whatever way call characteristics and mobile device application state has been fetched or transferred by ESIRS and regardless of whether byte caching is implemented for populating destination EdgeApp proxy cache devices with byte chunks.

All the techniques described herein implemented by the ESIRS for obtaining state, checkpointing it external to the EdgeApp proxy, and populating state at a destination edge nodes provide enhanced QoE (Quality of Experience) to mobile device users running applications in mobile device in a communications network having application-supporting network edge-nodes.

Figure 4:
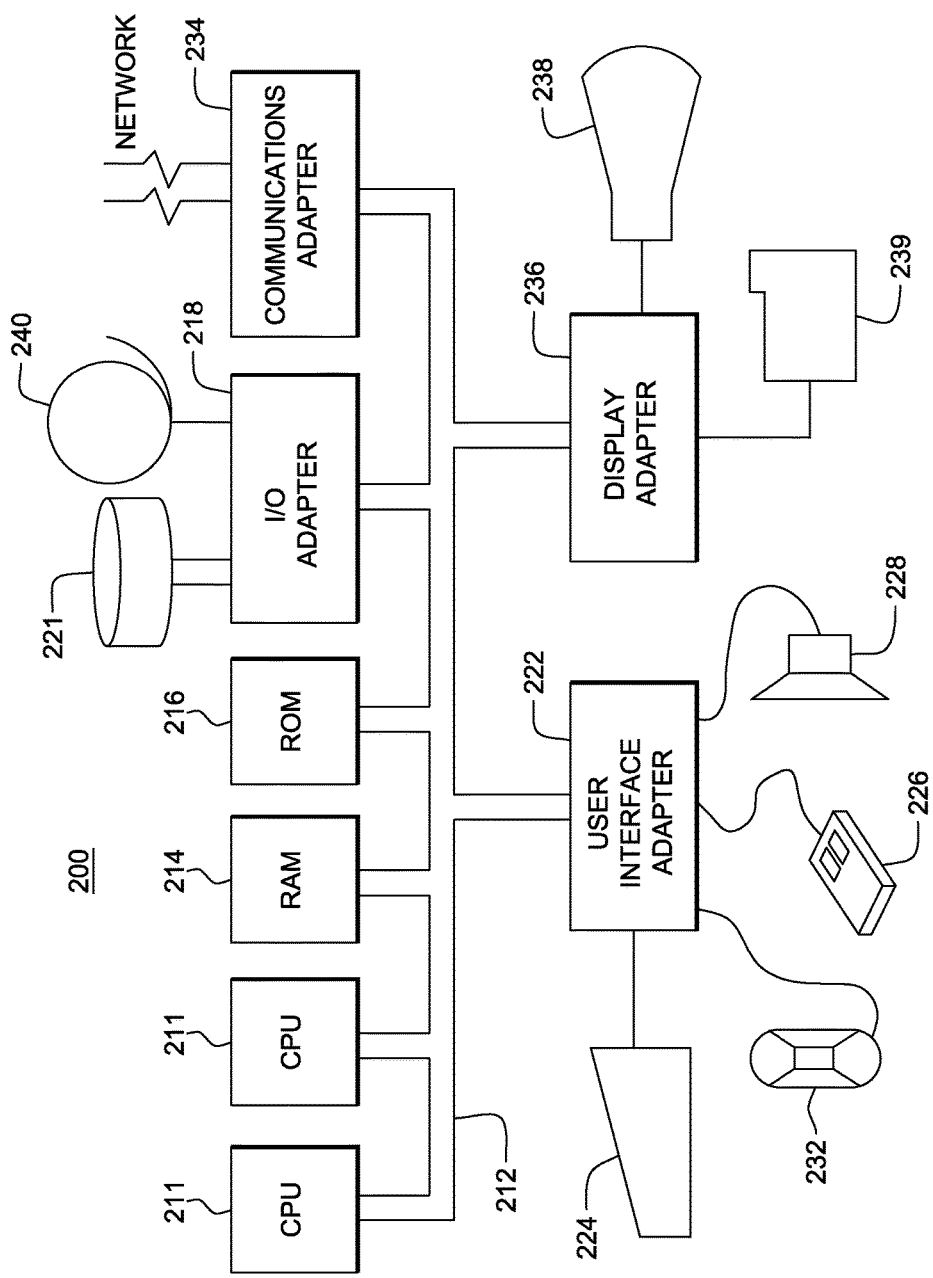

FIG. 4 illustrates one embodiment of an exemplary hardware configuration of the ESIRS computing system 200. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A system for providing enhanced quality of experience (QoE) to mobile device users comprising:
   a first computing device associated with a source communications network edge node for servicing a mobile device by providing a current point of attachment to a communications network, said first computing device configured as an associated application-aware edge-node proxy server for maintaining associated state information corresponding to one or more user applications currently running in the mobile device;
   a second computing device associated with a destination communications network edge node for servicing a mobile device by providing a new point of attachment to said communications network when roaming away from said source network edge node; and
   a third computing device provided in said network downstream from said network edge, said third device including an associated memory storage device and configured to perform a method to:
   inspect packet headers and payloads from packets transmitted over a communications link between the mobile device and the communications network while being serviced by said first computing device providing said current point of attachment;
   extract from said inspected packet payloads, application-specific state data of said one or more user applications running in the mobile device, said application-specific state data including identities of specific one or more application-aware edge-node server proxy devices servicing said user applications on said mobile device, and log said application-specific state data for storage at said associated memory storage device external to the source communications network edge node and said associated application-aware edge-node proxy server, said logged application-specific state data comprising: web links to cached objects that had been requested by a user application;
   receive a signal indicating a detection of an upcoming migration of said mobile device from said current point of attachment network to the new attachment point provided by the destination communications network edge-node;
   select, for an application-aware edge-node proxy server of said destination network edge-node, a method of reconstructing a state of a user application by the second computing device, said selecting comprising communicating a list of said web links to a destination application-aware edge-node proxy server that will service the mobile device at a destination network edge-node;
   transmit, in response to receiving said signal, said application-specific state data from storage at said associated memory storage device to a storage device associated with said second computing device at said destination network edge node and pre-fetching said cached objects from said list of web links for storage at the destination network edge-node prior to said upcoming migration; and
   said second computing device configured to reconstruct, based on said selected method, said application state of said currently running one or more mobile device user applications at the destination application-aware edge-node proxy server at said destination network edge-node to enable seamless continued service to the mobile device user prior to the destination network edge-node becoming said new point of attachment for said mobile device.

2. The system of claim 1, wherein to reconstruct said application state, said third computing device is further configured to:
   reconstruct state of a currently running mobile device user application at the destination network edge-node prior to a roaming mobile device session handoff from the current point of attachment at said source network edge node to the new point of attachment at said destination network edge-node.

3. The system as claimed in claim 1, wherein said third computing device is further configured to:
   detect said upcoming migration of said mobile device user from said point of attachment at a source network edge node to another attachment point at said destination network edge node; and
   generate a trigger to initiate a populating of application state at the second computing device upon said signal receiving.

4. The system as claimed in claim 3, wherein to detect said upcoming migration is based on one of: predictive estimation of the mobile device location given a presence in current cell in cellular network and attachment to a current network edge-node; or, is based on micro-diversity signal processing techniques of signals communicated by said mobile device.

5. The system as claimed in claim 2, wherein said third computing device is further configured to:
   utilize an application-specific application program interface (API) to obtain state of a mobile device application from the application-aware edge-node server at said source network edge node, wherein via said API, there is further initiated reconstructing said application state at the second computing prior to migrating said mobile device to said destination network edge node.

6. The system as claimed in claim 5, wherein state obtained utilizing an application program specific API include application links to objects cached to a web caching server, said third computing device further configured to:
request said second computing device to pre-fetch objects corresponding to said application links cached at the web caching server at the first computing device prior to handing-off said mobile device to said destination network node.

7. The system as claimed in claim 1, wherein said first and second computing devices each comprises one or more application-aware edge-node servers, said third computing device is further configured to:
obtain, from packet transmission call characteristics state data associated with the current mobile device call;
obtain from call characteristics state data an identifier of each said one or more application-aware edge-node servers servicing mobile device applications for a mobile device user; and
select, for each identifier, a method of populating application state at one or more application-aware edge-node servers at the destination network edge node associated with the identifier.

8. The system as claimed in claim 1, further comprising:
a byte caching encoder provided in said network for encoding bytes of content for caching at said first or second computing devices; and
a byte caching decoder provided at each said first and second computing devices for decoding bytes of content for use by a mobile device application at a respective source edge node or destination edge node.

9. A computer program product for providing enhanced quality of experience (QoE) to mobile device users, the computer program product comprising a non-transitory storage medium readable by a processing circuit and storing instructions run by the processing circuit for performing a method, the method comprising:
inspecting packet headers and payloads from packets transmitted over said communications link between a mobile device and a current communications network edge node providing a point of attachment to said network, said current communications network edge node including an associated application-aware edge-node proxy server;
extracting, from said inspected packet payloads, application-specific state data of one or more user applications currently running in the mobile device, said application-specific state data including identities of specific one or more application-aware edge-node server proxy devices servicing said user applications on said mobile device, and logging said application-specific state data in a storage device external to the current communications network edge node and said associated application-aware edge-node server proxy device, said logged application-specific state data comprising: web links to cached objects that had been requested by a user application;
receiving a signal indicating a detection of an upcoming migration of said mobile device from said current point of attachment network to a new attachment point provided by a destination communications network edge-node;
selecting, for an application-aware edge-node proxy server, a method of reconstructing a state of a user application, said selecting comprising communicating a list of said web links to a destination communications network edge node having an application-aware edge node proxy server that will service the mobile device at a destination network edge-node;
transmitting, responsive to said receiving said signal, said application-specific state data from storage at the current network edge node to a storage device associated with said destination network edge-node server and pre-fetching said cached objects from said list of web links for storage at the destination network edge-node prior to said upcoming migration; and
reconstructing, based on said selected method, said application state of said currently running one or more mobile device user applications at the destination application-aware edge-node proxy server device at said destination network edge-node server to enable seamless continued service to the mobile device user prior to the destination network edge-node becoming a new point of attachment for said mobile device.

10. The computer program product as claimed in claim 9, wherein said reconstructing said application state comprises:
reconstructing state of a currently running mobile device user application at the destination network edge-node prior to a roaming mobile user device session handoff from the current point of attachment to the new point of attachment at the destination network edge-node.

11. The computer program product as claimed in claim 10, wherein said method further includes:
detecting said upcoming migration of said mobile device user from one point of attachment of a source network cell to another attachment point in a destination network cell; and
generating a trigger to initiate a populating of application state and the reconstructing upon receiving said signal.

12. The computer program product as claimed in claim 9, wherein said detecting said upcoming migration is based on one of: predictive estimation of the mobile device location given a presence in current cell in cellular network and attachment to a current network edge-node; or is based on micro-diversity signal processing techniques of signals communicated by said mobile device.

13. The computer program product as claimed in claim 10, wherein said method further includes:
utilizing an application program specific API to obtain state of a mobile device application from an application-aware edge-node proxy server at a source node, said API further initiating reconstructing said application state at the destination application-aware edge-node proxy server prior to migrating said mobile device to said destination network node.

14. The computer program product as claimed in claim 13, wherein state obtained utilizing an application program specific API include application links to objects cached to a web caching server, said method further comprising:
requesting said destination application-aware edge-node proxy server to pre-fetch objects corresponding to said application links cached at a web caching server at a source application-aware edge-node server prior to handing-off said mobile device to said destination network node.

15. The computer program product as claimed in claim 9, wherein the method further comprises:

obtaining from the transmitted packets, call characteristics state data associated with the current mobile device call;

obtaining from the call characteristics state data an identifier of each said one or more application-aware edge-node servers servicing mobile device applications for a mobile device user; and selecting, for each identifier, a method of populating application state at one or more application-aware edge-node servers at the destination node associated with the identifier.

16. The computer program product as claimed in claim 9, wherein the method further comprises:

encoding bytes of content for caching at an application-aware destination edge node proxy server using a byte caching encoder provided in said communications network; and decoding, using a byte caching decoder provided at an application-aware destination edge node proxy server, said bytes of content for use by a mobile device application at a respective source edge node or destination edge node.

17. The system according to claim 1, wherein to inspect packet headers and payloads, said third computing device is further configured to:

classify one or more applications currently running in the mobile device by one of:

scanning strings and bits and byte pattern in the payloads in the packets transmitted between the mobile device and a current communication network edge node, or by scanning for one or more patterns in a communication behavior of the one or more applications.

18. The system according to claim 17, said first computing device at said current edge node employing a proxylet process to communicate with a different application-aware edge node proxy server device selected from the group comprising: a byte caching decode proxy server, a web caching proxy server, and video transcoding proxy server, wherein said proxylet process calls a specific interface for said reconstructing the user application state for a mobile device at the destination network edge-node.

19. The system according to claim 18, wherein an employed proxylet process is configured to know an application-specific state relevant to each edge-node server proxy devices, said extracting using an employed proxylet process to replace or complement a performed state extraction operation.

20. The system according to claim 18, wherein an employed proxylet process performs:

collecting and logging current edge node application server state through different servicing proxy device interfaces; and calling specific servicing proxy device interfaces to reconstruct the user application state for a mobile device at the destination network edge-node.

* * * * *